United States Patent
Anderson et al.

[11] Patent Number: 6,085,666
[45] Date of Patent: Jul. 11, 2000

[54] ARTICULATING TRAY ASSEMBLY

[75] Inventors: Rick A. Anderson, Grand Haven; Leif A. Norland, Holland, both of Mich.

[73] Assignee: Prince Technology Corporation, Holland, Mich.

[21] Appl. No.: 09/276,046

[22] Filed: Mar. 25, 1999

Related U.S. Application Data

[60] Provisional application No. 60/079,749, Mar. 27, 1998.

[51] Int. Cl.⁷ .................................................. A47B 23/00
[52] U.S. Cl. .............................................. 108/44; 108/134
[58] Field of Search ................................. 108/44, 45, 47, 108/134, 135, 1, 7, 9; 297/146, 217.6

[56] References Cited

U.S. PATENT DOCUMENTS

| | | | |
|---|---|---|---|
| 1,809,866 | 6/1931 | Riesche | 108/134 X |
| 2,173,569 | 9/1939 | Troendle | 108/134 X |
| 2,619,395 | 11/1952 | Kent | 297/146 X |
| 3,795,422 | 3/1974 | Robinson et al. | 297/146 |
| 4,791,873 | 12/1988 | Towfigh | 108/134 X |
| 5,046,433 | 9/1991 | Kramer et al. | |
| 5,188,421 | 2/1993 | Arsenault | |
| 5,269,229 | 12/1993 | Akapatangku | |
| 5,370,060 | 12/1994 | Wang | |
| 5,443,018 | 8/1995 | Cromwell | |
| 5,516,016 | 5/1996 | Anderson et al. | |
| 5,531,506 | 7/1996 | Scott | 297/146 |
| 5,878,672 | 3/1999 | Ostermann et al. | 108/44 |

FOREIGN PATENT DOCUMENTS 387927  2/1933  United Kingdom ................... 108/134

*Primary Examiner*—Jose V. Chen
*Attorney, Agent, or Firm*—Harness, Dickey & Pierce, P.L.C.

[57] ABSTRACT

A tray assembly for a vehicle, having an anchor member, a tray member, a first link pivotally mounted to the anchor member and pivotally secured to the tray member, and a second link pivotally mounted to the anchor member and pivotally secured to the tray member. The first and second links cooperate to guide the tray member during a deployment of the tray member from a stored position to a use position. The tray assembly also includes a stop member having a pin coupled with the tray member and a cam with a notch coupled to one of the first and second links. The two portions of the stop member engage each other and retain the tray member in a use position after the deployment of the tray member.

In one embodiment of the invention, the location of the pin of the stop member is selectively adjustable thereby allowing adjustment of the angle of the tray member relative to the anchor member. In another embodiment of the invention, the stop member allows further deployment of the tray member from the use position to a collapsed position during an application of an excessive force.

16 Claims, 5 Drawing Sheets

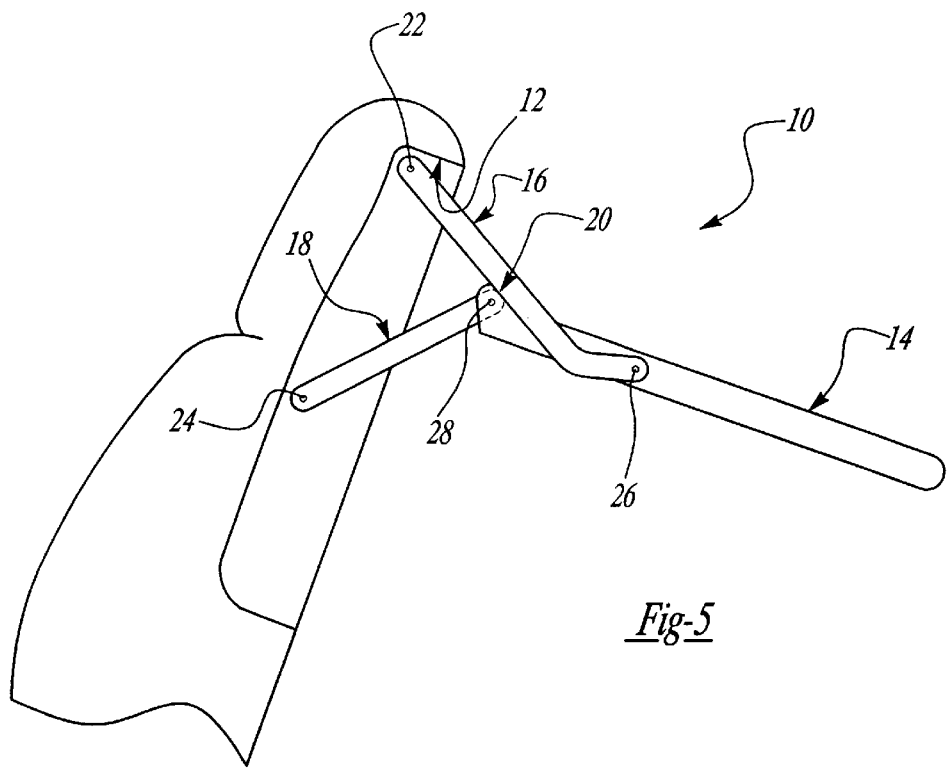
_Fig-5_
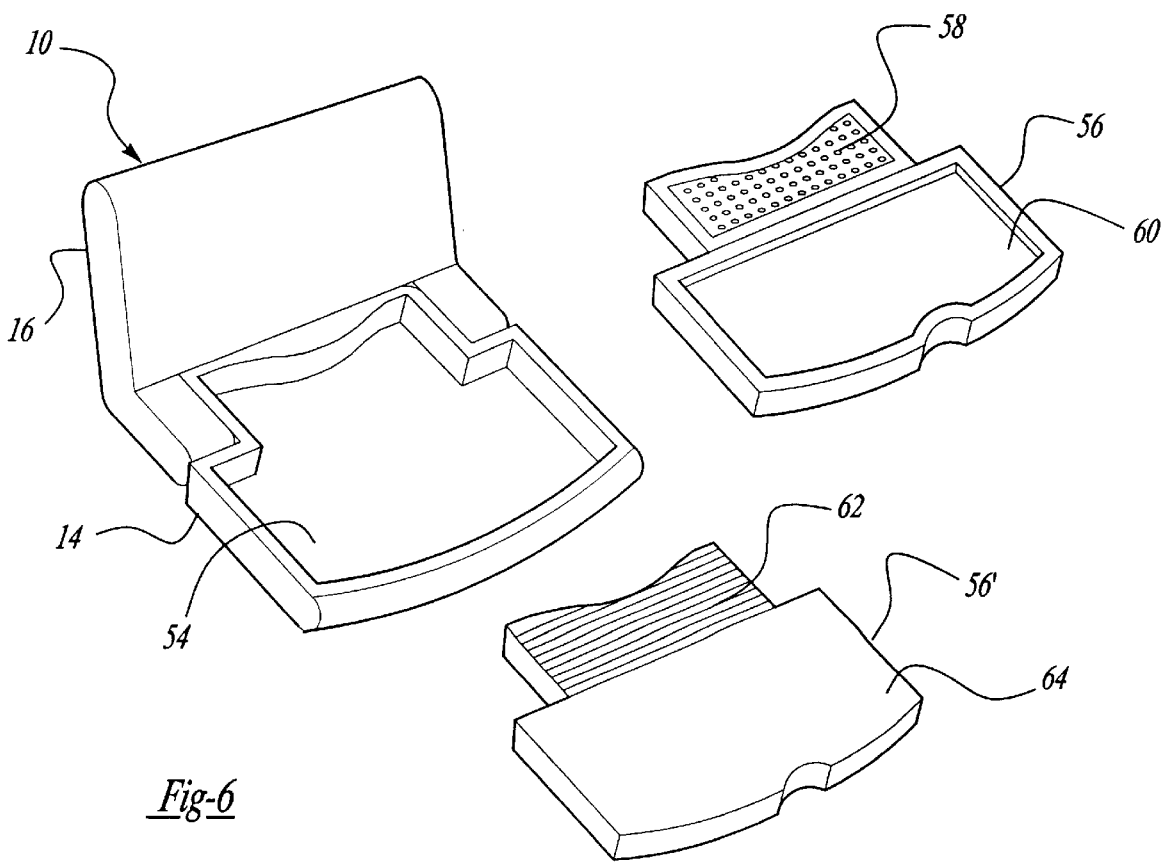
_Fig-6_

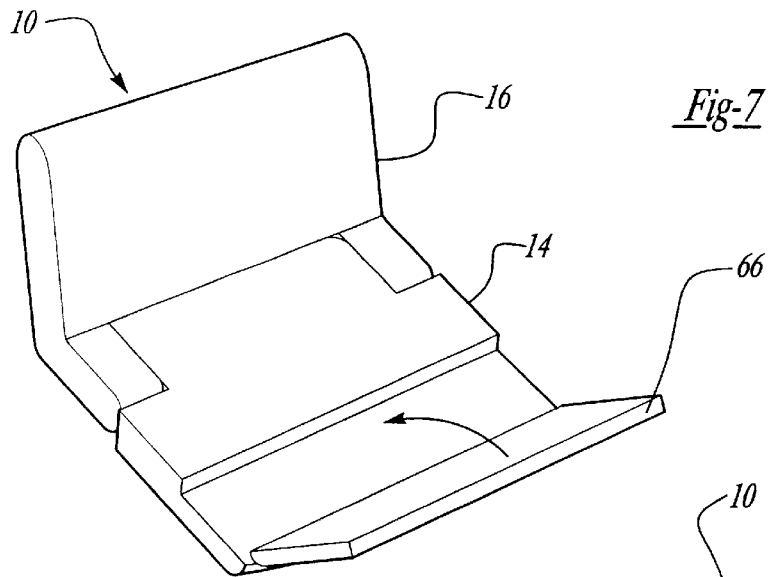
_Fig-7_
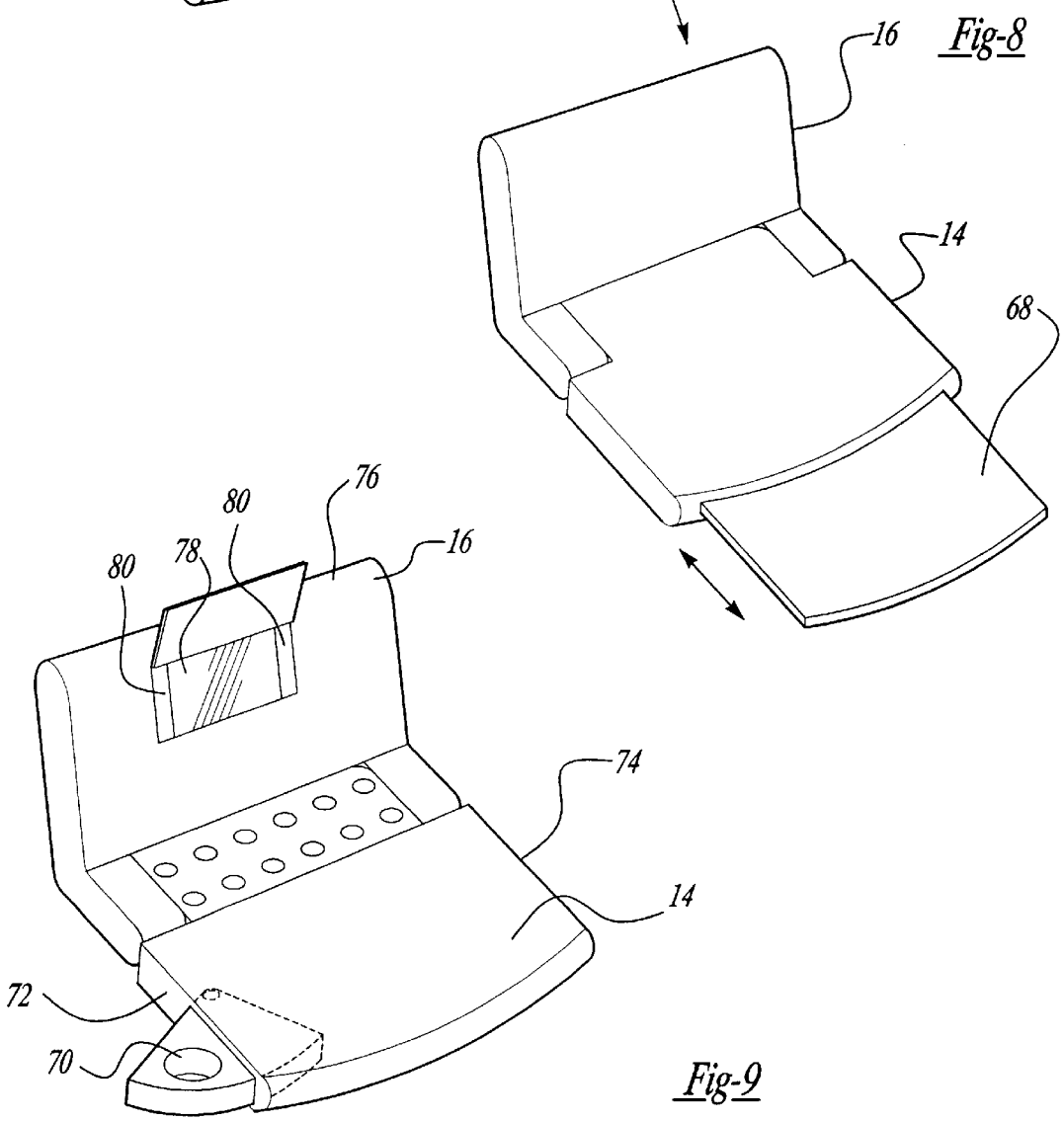
_Fig-8_
_Fig-9_

ARTICULATING TRAY ASSEMBLY

This application claims benefit to U.S. provisional Ser. No. 60/079,749 filed Mar. 27, 1998.

TECHNICAL FIELD OF THE INVENTION

This invention generally relates to tray assemblies for a vehicle and, more specifically, this invention relates to a tray assembly with a linkage mechanism that guides a tray member from a stored position to a use position.

BACKGROUND

Various types and configurations of tray assemblies have been used in the past. Some of these tray assemblies, when attached to the back side of a seat back, have provided a working surface for the user of the tray assembly. The conventional tray assemblies in the art have been used by adults as a surface on which to write and to retain beverages or containers, and by children as a surface on which to retain their toys. In certain situations, however, the conventional tray assemblies in the art have proven to be less than desirable.

The first of these situations occurs when an application of an excessive force (such as the force of a child sitting on the tray) is applied to the tray. The conventional tray assemblies in the art do not intentionally yield to such excessive forces, an excessive force would disfigure or destroy the attachment points or elements of these tray assemblies.

The second of these situations occurs when they tray assembly is attached to the back side of an adjustable seat back. In these situations, if the angle of the particular seat back is adjusted, then the angle of the tray assembly will be adjusted, because of the connection between the tray member and the seat. Users of the tray assembly may prefer, however, to use the working surface at a certain angle, for example, at an angle parallel to the horizontal. Since the conventional tray assemblies in the art do not allow selective angle adjustment, users cannot compensate for any change in the angle of the seat back and their tray assembly.

SUMMARY OF THE INVENTION

Accordingly, this invention provides for a tray assembly for a vehicle that overcomes the problems and disadvantages of the conventional techniques in the art. The invention also provides for a tray assembly with a linkage mechanism that guides a tray member from a stored position to a use position. Further, the invention provides for a tray assembly that allows further deployment of the tray member from the use position to a collapsed position upon the application of an excessive force. Further, the invention provides for a tray assembly that allows selective adjustment of the angle of the tray member to compensate for any change in the angle of the seat back to which the tray assembly is attached.

Briefly, the invention includes a tray assembly for a vehicle, having an anchor member, a tray member, a first link pivotally mounted to the anchor member and pivotally secured to the tray member, and a second link pivotally mounted to the anchor member and pivotally secured to the tray member. The first and second links cooperate to guide the tray member during a deployment of the tray member from a stored position to a use position. The tray assembly also includes a stop member having a pin coupled with the tray member and a cam with a notch coupled to one of the first and second links. The two portions of the stop member engage each other and retain the tray member in a use position after the deployment of the tray member.

In one embodiment of the invention, the stop member allows further deployment of the tray member from the use position to a collapsed position during an application of an excessive force. In another embodiment of the invention, the location of the pin of the step member is selectively adjustable thereby allowing adjustment of the angle of the tray member relative to the anchor member.

Further features and advantages of the invention will become apparent from the following discussion and accompanying drawings.

BRIEF DESCRIPTION OF THE DRAWINGS

FIG. 5 is an elevation view of the tray assembly in a collapsed position; and

FIGS. 6–12 are perspective views of alternative embodiments of the invention.

DETAILED DESCRIPTION OF THE PREFERRED EMBODIMENT

The following description of the preferred embodiment is merely exemplary in nature, and is in no way intended to limit the invention or its application or uses.

Figure 1:
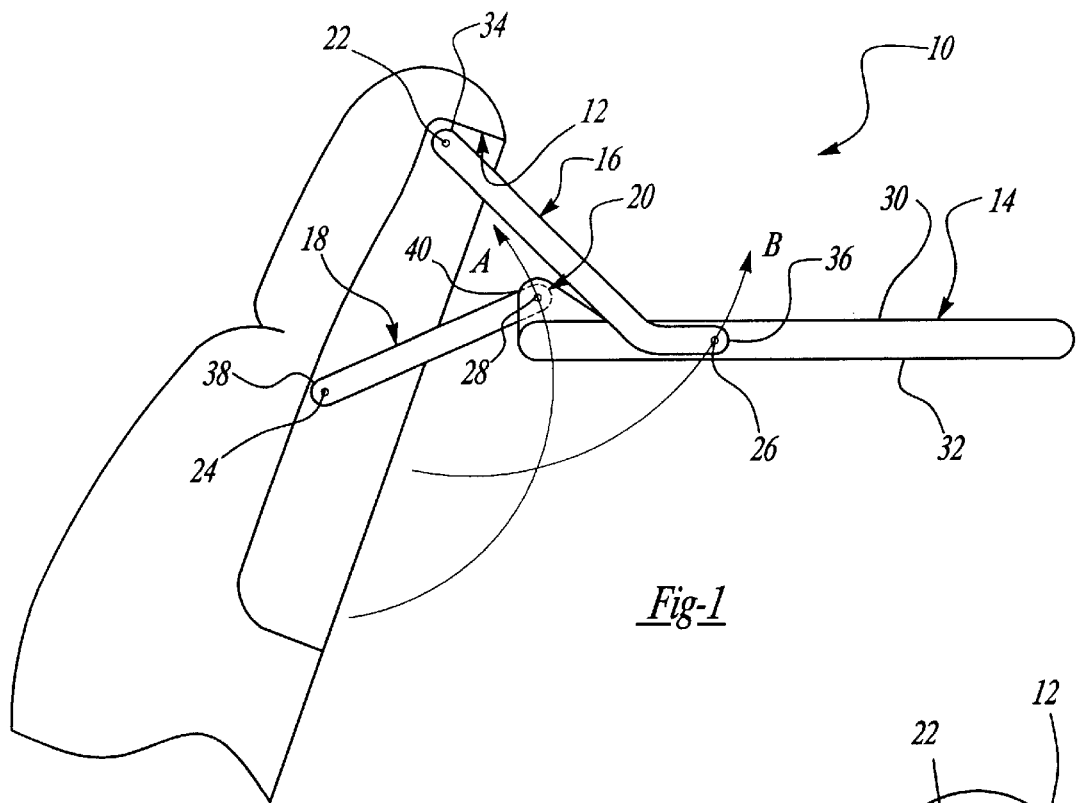
FIG. 1 is an elevation view of the tray assembly of the invention in a use position.

The tray assembly 10 of the invention includes an anchor member 12, a tray member 14, a first link 16, a second link 18, and a stop member 20, as shown in FIG. 1. The anchor member 12 is attachable to any interior surface of a vehicle, such as the back side of a seat back so as to mount the tray assembly 10. The anchor member 12 includes a first attachment point 23 and a second attachment point 24. The anchor member 12 is made of a high strength material, such as certain plastics, wood, or metal.

The tray member 14 includes a first attachment point 26 defining a first pivot axis and a second attachment point 28 defining a second pivot axis. On one side, the tray member 14 includes a working surface 30 for the occupant of the vehicle. On the other side, the tray member 14 includes a covering surface 32 as an aesthetic aspect of the tray assembly 10. The tray member 14, like the anchor member 12, is made of a high strength material, such as certain plastics, wood or metal.

The first link 16 has one end 34 pivotally mounted to the first attachment point 22 of the anchor member 12, and another end 36 pivotally secured to the first attachment point 26 of the tray member 14. Likewise, the second link 18 has one end 38 pivotally mounted to the second attachment point 24 of the anchor member 12, and another end 40 pivotally secured to the second attachment point 28 of the tray member 14. The first link 16 and the second link 18, combined with the anchor member 12 and the tray member 14, act as a four-bar mechanism, with the anchor member 12 as a first bar (from the point 24 to the point 22), the first link 16 as a second bar, the tray member 14 as a third bar (from the point 26 to the point 28), and the second link 18 as the fourth bar. The first link 16 and the second link 18 are made of a high strength material, such as certain plastics, wood, or metal.

Figure 2:
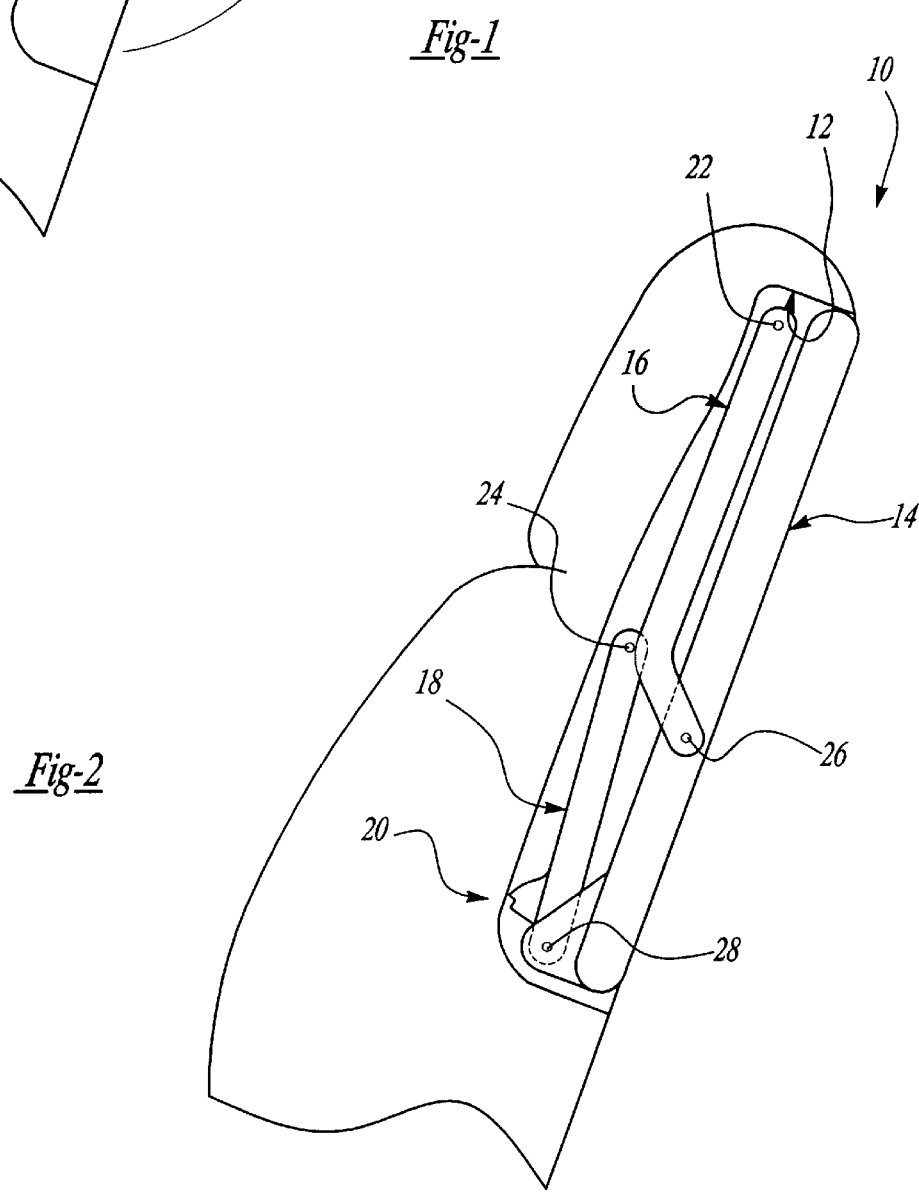
FIG. 2 is an elevation view of the tray assembly in a stored position.
Figure 1:
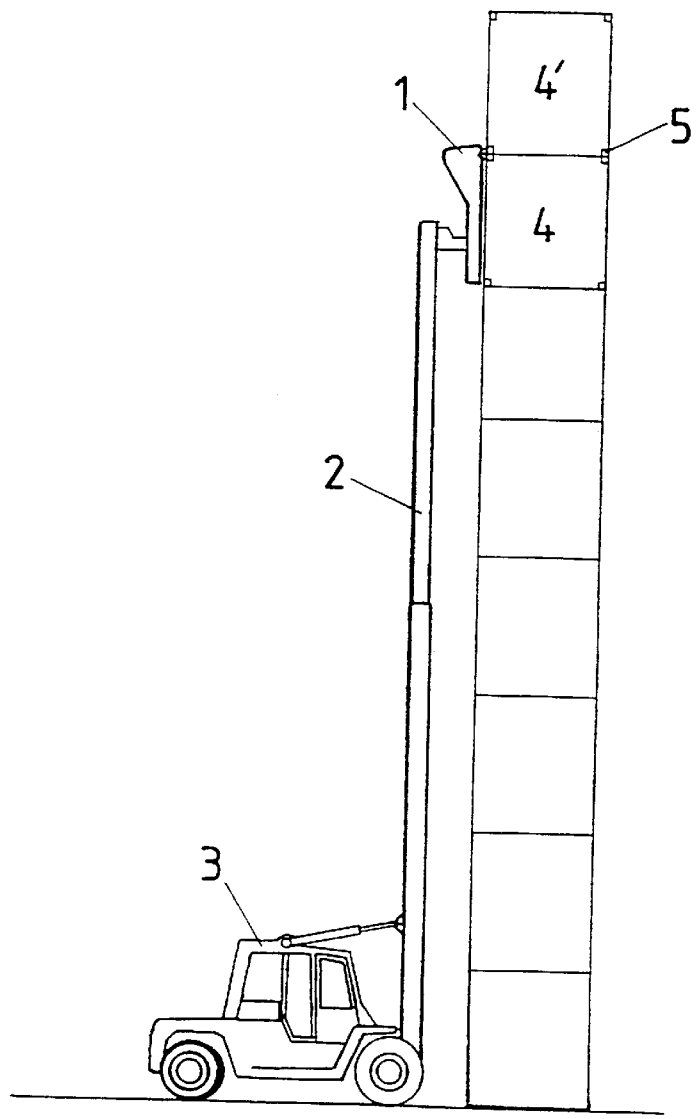
Figure 2:
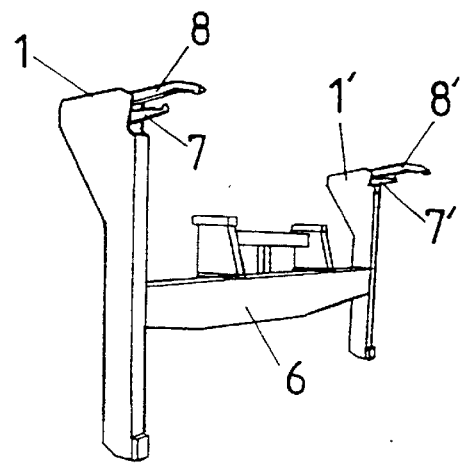

The tray assembly 10 may be retracted from a use position (FIG. 1) into a stored position, as shown in FIG. 2. During such retraction, and during the deployment from the stored position to the use position, the first link 16 and the second link 18 cooperate to guide the tray member 14. The first attachment point 26 and the second attachment point 28 of the tray member 14 are displaced in generally upward directions A and B in the use position relative to the stored position, as shown in FIG. 1. The generally upward directions A and B are defined relative to the working surface 30 of the tray member 14 in the use position.

Figure 3:
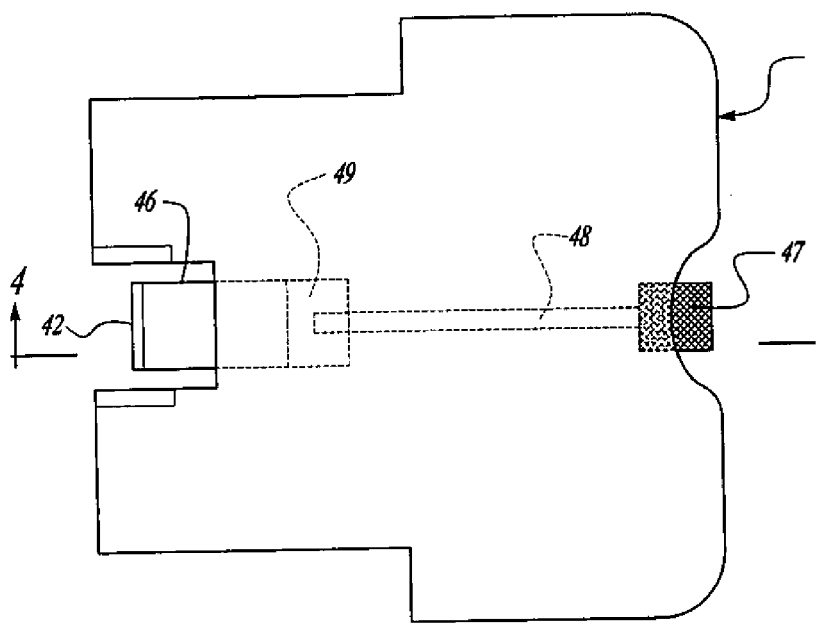
FIG. 3 is a top view of the tray member.
Figure 4:
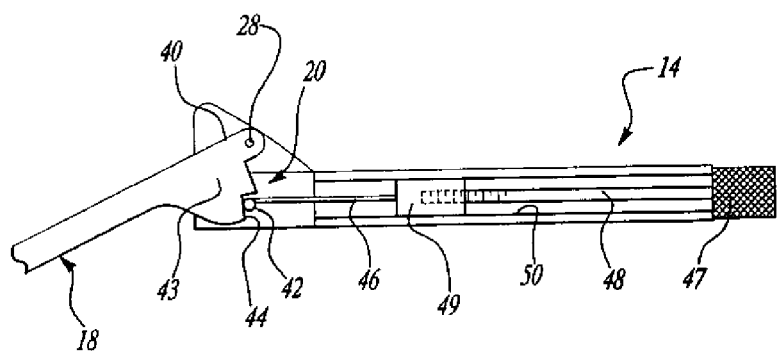
FIG. 4 is a cross-sectional view of the tray member taken along the line 4—4 in FIG. 3, with the addition of a partial cross-sectional view of the second link.

The stop member 20 includes a pin 42 coupled to the tray member 14, and a cam 43 with a notch 44 located on the second link 18 and positioned to receive the pin 42, as shown in FIGS. 3 and 4. During deployment of the tray member 14 from the stored position to the use position, the pin 42 approaches and engages the notch 44. This engagement retains the tray member 14 in the use position and prevents any further deployment of the tray member 14. In an alternative embodiment of the invention, the notch 44 may be located in the first link 16. In a further alternative embodiment of the invention, the pin 42 may be coupled to either the first link 16 or the second link 18, and the notch 44 may be located in the tray member 14. The pin 42 is made of a high strength material, such as certain plastics or metal, and may include a rolling element (not shown).

The preferred embodiment of the invention also includes a steel spring 46 coupled to the tray member 14 and attached to the pin 42. The steel spring 46 functions as the breakaway feature for the tray member 14. During an application of a typical force (e.g., the force of an occupant writing on the working surface 30), the steel spring 46 biases the pin 42 into the notch 44, thereby resisting further deployment of the tray member 14. In some situations, however, an excessive force (e.g., the force of a child sitting on the writing surface 30) may be applied to the tray member 14 that would otherwise disfigure the attachment points or other elements of the tray assembly 10. During an application of such an excessive force, the steel spring 46 flexes and allows the pin 42 to pass around the notch 44, thereby allowing further deployment of the tray member 14 from the use position to a collapsed position, as shown in FIG. 5. The tray member 14 may be easily reset into the use position by lifting the tray member 14 and allowing the pin 42 to pass back into the notch 44. In an alternative embodiment of the invention, the pin 42 may be made from an elastic material such that the pin 42 itself flexes around the notch 44. In a further alternative embodiment of the invention, the pin 42 may be coupled to compression or tension helical springs, leaf springs, torsional springs, pneumatic springs, fluid pressure, or any other method which would allow further deployment of the tray member 14 upon the application of an excessive force.

The preferred embodiment of the invention further includes a thumb wheel 47, an externally-threaded rod 48, and an internally-threaded member 49. The thumb wheel 47 is rotatably mounted to the tray member 14 for selective rotation by an occupant, and is connected to the rod 48. The internally-threaded member 49 is slidably mounted in a slot 50 of the tray member 14 for fore and aft movement, and is connected to the pin 42. Through the communication between the external threads of the rod 48 and the internal threads of the member 49, the rod 48 transfers the rotational movement of the thumb wheel 47 into a translational movement of the member 49 and the pin 42. The movement of the pin 42 allows further rotation of the tray member 14 relative to the second link 18 thereby adjusting the angle of the tray member 14 in the use position relative to the anchor member 12. Thus, by a simple rotation of the thumb wheel 47, an occupant of the vehicle can adjust the angle of the tray member 14. This angle adjustment feature is important if the tray assembly is attached to the back side of a seat back. In these situations, if the angle of the particular seat back is adjusted, then the angle of the tray member 14 will be adjusted, because of the connection between the tray member 14 and the seat back. To compensate for the angle change of the seat back, the occupant can rotate the thumb wheel 47 and selectively adjust the angle of the tray member 14 relative to the seat back. In an alternative embodiment of the invention, the pin 42 may be connected to any device which allows fore and aft movement, such as linkages, screw conveyors, rack-and-pinion gears, or any other simple mechanism. In a further alternative embodiment of the invention, the location of one of the first or second attachment points 26 and 28 may be selectively adjustable relative to the other, such that the angle of the tray member 14 may be adjusted relative to the anchor member 12. The thumb wheel 47, the rod 48, and the member 49 are each made of a high strength material, such as certain plastics or metals.

In addition to the previously mentioned structural aspects of the invention, the tray assembly 10 also includes several occupant-oriented features. Several of these features cooperate with the tray member 14. For example, the tray member 14 may include a receiving member 54 integrally coupled with the tray member 14 and adapted to receive modules 56, as shown in FIG. 6. Some of the modules 56 may be directed towards children and may include interlocking surfaces 58 that cooperate with LEGO® of DUPLO® toys, or may include a dry-erase surface 60. Other modules 56' may be directed towards adults, and may include rubber surfaces 62 that hold fluid containers, pencils, and pens, or may include smooth surfaces 64 that provide an adequate writing surface. Alternatively, any of the previously mentioned surfaces may be permanently adhered to the tray member 14. All of these surfaces are known and used in the art of working surfaces, and their implementation as a working surface 30 or as a module 36 would be readily understood by a person of ordinary skill in the art. The cavity defined by the receiving member 54 may also be used as a storage cavity. In this arrangement, the tray assembly 10 would be provided with a cover (not shown) for the storage cavity. In alternative embodiment, the tray member 14 may include a fold out surface 66, as shown in FIG. 7, or an extendable surface 68, as shown in FIG. 8. Both the fold out surface 66 and extendable surface 68 provide an additional working surface for the tray member 14 and allow the tray member 14 to extend toward the occupant of the vehicle. As a further alternative embodiment, the tray member 14 may include an articulated cup holder 70 secured within the tray member 14, as shown in FIG. 9.

Figure 10:
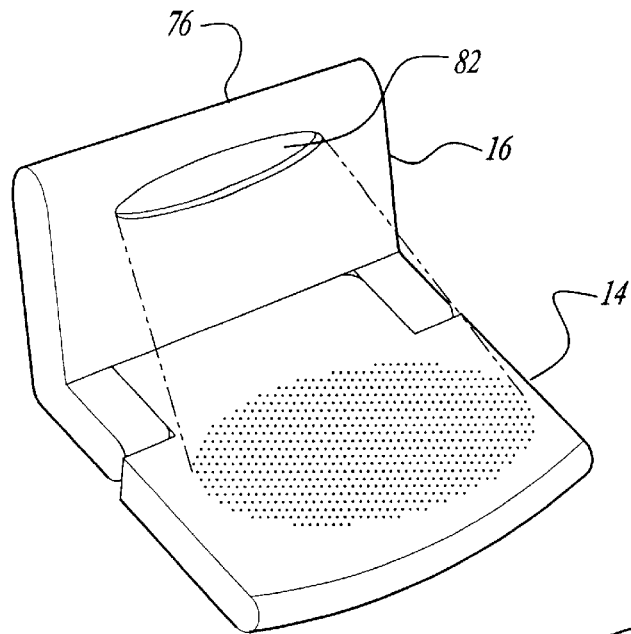
Figure 11:
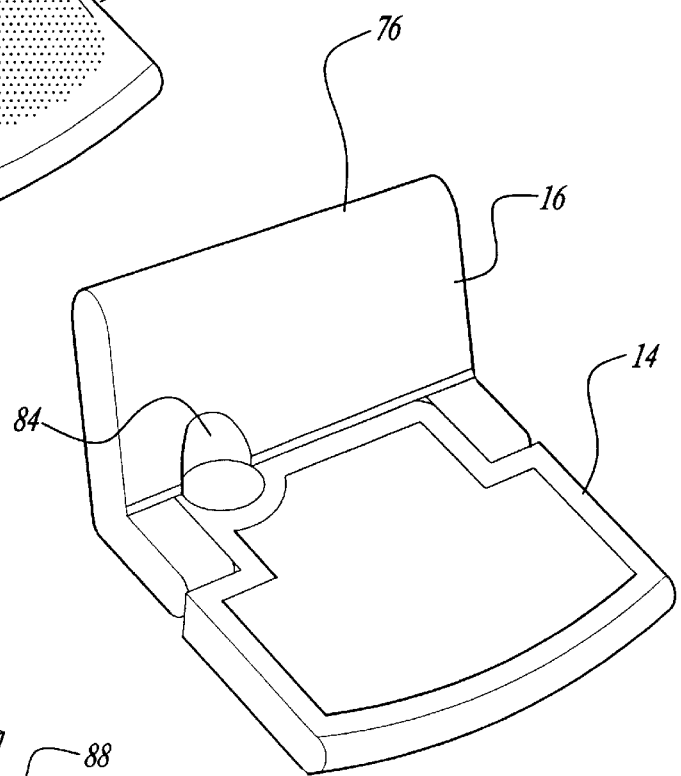
Figure 12:
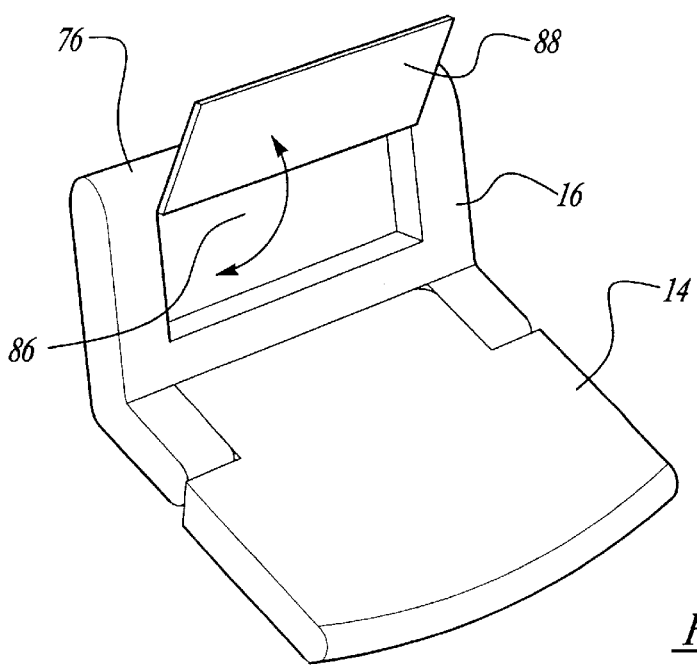

Other occupant-oriented features of the invention cooperate with the first link 16. In the preferred embodiment, the first link 16 extends from the left edge 72 of the tray member 14 to the right edge 74 of the tray member 14, forming a support surface 76, as shown in FIG. 9. This support surface 76 may include a vanity mirror 78 with a vanity mirror light 80, or may include a working surface light 82, as shown in FIG. 10. The vanity mirror 78, the vanity mirror light 80, and the working surface light 82 are all known and used in the art of vehicular interiors, and their implementation in the support surface 76 would be readily understood by a person of ordinary skill in the art. Alternatively, the support surface 76 may define a hemi-cylindrical surface 84 which cooperates with the working surface 30 of the tray member 14 to form a cup holder, as shown in FIG. 11. Further, the support surface 76 may be designed with a storage cavity 86 and a storage cavity cover 88, as shown in FIG. 12.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

We claim:

1. A tray assembly for a vehicle, comprising:

an anchor member attachable to an interior surface of a vehicle;

a tray member defining a first pivot axis and a second pivot axis;

a first link having one end pivotally mounted to said anchor member, the other end pivotally secured to said tray member at said first pivot axis;

a second link having one end pivotally mounted to said anchor member, and the other end pivotally secured to said tray member at said second pivot axis; and a stop member having a first portion coupled with said tray member and a second portion coupled with one of said first and second links; and wherein said first and second links cooperate to guide said tray member during a deployment of said tray member from a stored position to a use position, and wherein said first and second portions of said stop member engage each other and retain said tray member in a use position after the deployment of said tray member.

2. The tray assembly of claim 1, wherein the location of said first portion of said stop member is selectively adjustable relative to said first and second pivot axes thereby allowing selective adjustment of the angle of said tray member relative to said anchor member when said tray member is in the use position.

3. The tray assembly of claim 1, whereupon application of a force greater than a predetermined threshold, said stop member allows further deployment of said tray member from said use position to a collapsed position.

4. The tray assembly of claim 1, wherein said stop member includes a pin coupled with said tray member, and a notch defined by said second link.

5. The tray assembly of claim 4, wherein the location of said pin is selectively adjustable relative to said first and second pivot axes thereby allowing selective adjustment of the angle of said tray member relative to said anchor member.

6. The tray assembly of claim 4, wherein said pin is spring biased such that upon application of a force less than a predetermined threshold, said stop member resists further deployment of said tray member, and upon application of a force greater than said predetermined threshold, said stop member allows further deployment of said tray member from said use position to a collapsed position.

7. A tray assembly for a vehicle, comprising:

an anchor member attachable to an interior surface of a vehicle;

a tray member defining a first pivot axis and a second pivot axis;

a first link having one end pivotally mounted to said anchor member, and the other end pivotally secured to said tray member at said first pivot axis; and a second link having one end pivotally mounted to said anchor member, and the other end pivotally secured to said tray member at said second pivot axis;

wherein said first and second links cooperate to guide said tray member during a deployment of said tray member from a stored position to a use position, wherein said tray member defines a left edge, a right edge, and a primary surface, and wherein said first link extends generally from said left edge of said tray member to said right edge of said tray member forming a support surface.

8. The tray assembly of claim 7, wherein said support surface includes a vanity mirror.

9. The tray assembly of claim 8, wherein said support surface further includes a vanity mirror light.

10. The tray assembly of claim 7, wherein said support surface includes a light.

11. The tray assembly of claim 7, wherein said support surface defines a recessed cavity for providing storage.

12. The tray assembly of claim 14, further comprising a cover member securable to said support surface over the recessed cavity.

13. The tray assembly of claim 7, further comprising a receiving member integrally coupled with said tray member and adapted to receive modules.

14. The tray assembly of claim 7, further comprising a foldout surface pivotally attached to said tray member.

15. The tray assembly of claim 7, further comprising an extendable surface slidably secured to said tray member.

16. The tray assembly of claim 7, wherein said tray member defines a recessed cavity for providing storage.

* * * * *

UNITED STATES PATENT AND TRADEMARK OFFICE
CERTIFICATE OF CORRECTION

PATENT NO.        : 6,085,666
APPLICATION NO. : 09/276046
DATED             : July 11, 2000
INVENTOR(S)       : Rick A. Anderson and Leif A. Norland It is certified that error appears in the above-identified patent and that said Letters Patent is hereby corrected as shown below:

In the Drawings

Replace Sheet 2 of 5 (Figures 1 and 2) with replacement Sheet 2 (Figures 3 and 4).

Replacement Sheet 2 submitted herewith was submitted on March 10, 2000 with the payment of the issue fee. The drawings on Sheet 2 that was published with the granted patent appear to be for a different and unrelated application or patent.

Signed and Sealed this

Twenty-fifth Day of September, 2007

JON W. DUDAS
*Director of the United States Patent and Trademark Office*